Feb. 24, 1970    J. W. CUNNINGHAM    3,497,669
CONTROL OF DROP SIZE IN SPRAY WELDING
Filed July 12, 1968
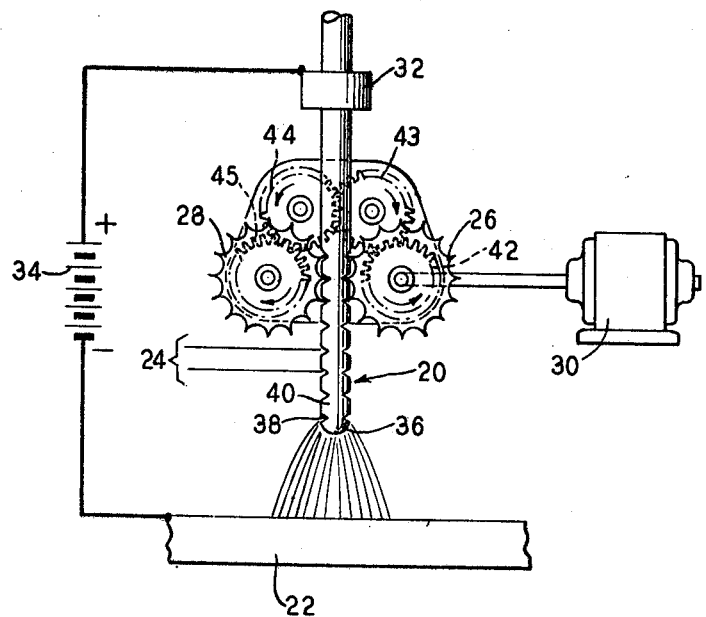
INVENTOR
JOHN W. CUNNINGHAM
BY
ATTORNEY

United States Patent Office 3,497,669
Patented Feb. 24, 1970

3,497,669
CONTROL OF DROP SIZE IN SPRAY WELDING
John W. Cunningham, Chevy Chase, Md., assignor to Air Reduction Company, Incorporated, New York, N.Y., a corporation of New York
Filed July 12, 1968, Ser. No. 744,354
Int. Cl. B23k 9/00
U.S. Cl. 219—137                    7 Claims

ABSTRACT OF THE DISCLOSURE

This invention relates to the method and apparatus for consumable electrode welding with an electric arc whereby the size of metal drops transferred to the workpiece is controlled by notching the electrode at desired intervals to control the current density in the electrode. The current density may be controlled to vary above and below the transition level.

---

The spray mode of metal transfer, for a given composition and diameter of electrode, as described in U.S. Patent No. 2,504,868, requires a certain minimum welding current, commonly called the transition current. In a current range immediately below the transition current, a globular mode of metal transfer may be observed. In the globular mode, the welding current is sufficient to melt the electrode material as the electrode enters the heated region of the arc. The molten material collects in a drop at the electrode tip, the drop growing in size until it becomes heavy enough to fall off. The falling drop cannot be easily directed toward an out of position workpiece and so this method is poorly adapted to out of position welding and is practically limited to flat work. The drops are usually larger than is desired and the quality of the resulting weld is poor. This mode, however, has the virtue of relatively low welding current with resultant lower temperature and lower fluidity in the molten metal. The lower temperature permits of welding thin materials without melting or burning the work. The lower fluidity tends to hold molten metal in place while it solidifies in out of position welding.

In the spray mode of metal transfer, the welding current at or above the transition value, produces what is commonly called a pinch effect in the drop of molten material adhering to the tip of the electrode. This effect is produced by the mutually attractive forces of currents flowing in one and the same direction in the molten metal with the higher current density, tending to pinch the molten drop off from the tip of the electrode. At the transition current value, the drop is detached by the pinch effect and the force of the arc propels the drop toward the work or in whatever direction the electrode is pointed. The drops are detached successively as they form, in relatively rapid succession. The drops are generally much smaller than the drops detached by gravity in the globular mode and so come off at a rate of more drops per second. The directive propulsion of the drops, their smaller size and more rapid succession, forming in effect a spray, are characteristics that make this mode of metal transfer particularly useful for out of position welding, for example overhead work. The spray mode, however, has the disadvantage of the relatively high arc current and resultant high heating of the work. The tendency is to make the molten metal too fluid for out of position welding, as well as to burn or melt thin workpieces.

In accordance with the invention, I obtain advantageous characteristics of the spray mode of metal transfer by means of a modified spray-like transfer mode with a welding current considerably below the transition current for the usual operation in the spray mode.

I preform the electrode, which is usually a wire of uniform cross-section, into a succession of partially separated beads connected by notched portions of restricted diameter. The notches promote a pinch effect. The spacing of the notches determines the size of drops to be formed by the pinch effect as the electrode enters the hot region of the arc. The restricted diameter at the notch provides the necessary increase in current density which raises the current in the restricted diameter portion above the transition current for an electrode of the restricted diameter, thereby providing the pinching action and arc force necessary to detach a drop and propel it away from the electrode tip in the direction in which the tip is pointed. The size of the bead formed between notches is preferably made to lie in the range of drop sizes ordinarily formed in the spray transfer mode. The over-all result is a transfer mode having advantages of the usual spray transfer mode but operating at a reduced value of welding current and with attendant reduced fluidity and lower rate of heat transfer to the work.

The way in which the invention is believed to operate may be further explained by considering a particular electrode in the form of a wire of uniform cross-section having a given melting rate in an electric arc current of given value. For example, consider a steel wire of a certain composition, which in an electric arc current of 150 amperes operates in a globular transfer mode with a melting rate of 140 inches per minute, which for this wire is 7 pounds per hour. This wire is one having a diameter of about 0.062 inch. It is found that with an arc current of 150 amperes this wire forms about 8 drops per second. Computation shows that each drop is formed by melting about 0.29 inch of wire. In other words, the diameter of the drop is several times the diameter of the unmelted wire. This drop is several times the size of the drops customarily found in the spray transfer mode.

The transition current for this wire is found to be about 250 amperes. By notching the wire to a diameter of about 0.03 inch at the portion of restricted diameter, the current density in the notched portion is so increased that the pinch effect is induced, thereby forcing off the drop that has formed at the electrode tip before that drop has reached the size required to separate it by gravity. The number of drops per second can be regulated by selecting the distance between notches.

As a guide in selecting the drop size, it is useful to consider the drop size for the same wire, unnotched but operated with the current increased to the transition value. The melting rate goes up as the square of the arc current, giving for this wire at 250 amperes a melting rate of about 390 inches per minute. It has been found that in the spray mode at 250 amperes arc current, the spray from this wire forms at about 200 drops per second. Computation shows that the drop length is about 0.03 inch. That is, the drop is formed from a length of wire that is about one-half the diameter of the unmelted wire.

To obtain drops of approximately this same size from the notched wire the notches can be placed at about the same spacing, 0.03 inch. At the lower melting rate of the wire at 150 amperes, this comes out about 72 drops per second.

Other drop sizes can be determined as desired. For example, 40 drops per second is the geometric mean between the globular rate of 8 drops per second and the usual spray mode rate of 200 drops per second. This determines a spacing of about 0.06 inch between notches.

Other features, objects and advantages will appear from the following more detailed description of an illustrative embodiment of the invention, which will now be given in conjunction with the accompanying drawing, the single figure of which is a schematic representation of a welding device embodying the invention.

Referring to the drawing, 20 represents a notched or beaded electrode for an electric arc, which arc is formed between the tip of the electrode 20 and a workpiece 22. The distance 24 between notches is contemplated in general to be comparable with the diameter of the electrode, ranging from say one-half or one-third the electrode diameter to say one to three diameters, although this range may be exceeded in either direction in some cases.

If desired, the notches in the electrode may be formed as the electrode is being advanced into the arc, provided the physical characteristics of the wire permit. Otherwise, the notches may be formed by any suitable process before the electrode is brought to the welding device.

The drawing illustrates how special drive rolls may be used to notch the electrode as it is being fed into the arc. Concavely knurled drive rolls 26 and 28 are shown, between which the electrode 20 is drawn along and notched as it is drawn. To insure that the notches on the two sides of the electrode 20 are uniformly opposite each other, the drive rolls 26 and 28 are geared together as indicated schematically by a train of pinions 42, 43, 44, 45, of which pinion 42 is attached to roll 26 and pinion 45 to roll 28. The rolls are driven by any suitable power source, illustrated as an electric motor 30, in the direction to feed the electrode into the arc.

Welding current is supplied to the electrode 20 through a contact shoe 32 from any suitable source of welding power, shown schematically as a battery 34.

The welding current is adjusted to a value somewhat less than the transition current for spray transfer for the material and diameter of the electrode used. At this current, the tip 36 of the electrode 20 forms a molten ball which is too light to be dislodged by gravity and too heavy for the force of the arc to dislodge at the given current. The notched portion of electrode nearest the arc is designated 38. When this notched portion of the electrode enters the high heat of the arc, the concentration of current in the portion of restricted diameter at the notch rises above the transition value of arc current, thereby causing the drop 36 of molten metal on the tip of the electrode to be forced off and propelled to the workpiece. As the electrode advances further into the arc region, the next bead 40 is melted and later separated and propelled as above described. All along, the arc current remains at the original value, below the transition value for normal spray transfer.

The number of drops per second which are formed and propelled from the electrode is determined by the melting rate of the electrode and the interval between the notches.

In general, with a given spacing between notches there will be found a range of operable current values. If the current is so low as to be below this range, there will be no pinching nor propelling action imparted at the portions of electrode of restricted diameter and the drop will grow until detached by gravity. If the current is too high, spray transfer will be continuous, with no advantage accruing from the notched form of the electrode. It is most advantageous to use the lowest satisfactory value of current in the observed operating range.

While illustrative forms of apparatus and methods in accordance with the invention have been described and shown herein, it will be understood that numerous changes may be made without departing from the general principles and scope of the invention.

What is claimed is:

1. The method of controlling drop size in electric arc inert gas welding with a consumable electrode, which method comprises the steps of notching the electrode into partially detached beads of a desired size, connected by electrode portions of reduced diameter, and operating the electrode at a current sufficiently great to melt the successive beads as they reach the heated region of the arc, said current being less than the transition value for spray transfer in electrode portions of non-reduced diameter, but great enough to cause detachment and propulsion of the molten bead to the workpiece as an electrode portion of reduced diameter reaches the heated region of the arc, whereby the mode of metal transfer is substantially a spray mode operating at a current materially less than the transition current of the unnotched electrode.

2. The method according to claim 1, in which the electrode is notched at intervals from about one-third the electrode diameter to about three times said diameter.

3. The method according to claim 1, in which the electrode is notched at intervals approximately one-half the electrode diameter.

4. The method according to claim 1, in which the electrode is notched at intervals of about the diameter of the electrode.

5. The method according to claim 1, in which the electrode portion of reduced diameter is about one-half the diameter of the unnotched portion of the electrode.

6. Apparatus for performing substantially a spray mode of metal transfer from a consumable electrode to a workpiece in electric arc inert gas welding, comprising, in combination, means to notch said electrode into partially detached beads of a desired size connected by electrode portions of reduced diameter, means to feed said notched electrode toward said workpiece, means to supply arc current to said electrode at a rate sufficient to melt the successive beads as they reach the heated region of the arc, said current being less than the transition value for the electrode portions of non-reduced diameter but great enough to cause detachment and propulsion of the molten bead to the workpiece as an electrode portion of reduced diameter reaches the heated portion of the arc, whereby the current is materially less than the transition current of the unnotched electrode.

7. Apparatus according to claim 6, in which the said means to notch said electrode is combined with said means to feed said electrode toward said workpiece.

References Cited

UNITED STATES PATENTS

| 2,087,225 | 7/1937 | Austin | 219—137 X |
| 2,914,643 | 11/1959 | Fields et al. | 219—130 X |
| 3,016,451 | 1/1962 | Cornell | 219—130 |
| 3,361,892 | 1/1968 | Spencer | 219—131 |
| 3,365,564 | 1/1968 | Boughton | 219—137 X |

JOSEPH V. TRUHE, Primary Examiner

G. A. MONTANYE, Assistant Examiner

U.S. Cl. X.R.

219—131